United States Patent

Takahashi et al.

Patent Number: 6,001,465
Date of Patent: Dec. 14, 1999

[54] LIGHT SHIELDING BLADE FOR CAMERA MADE OF PARA-ORIENTATION AROMATIC POLYAMIDE FILM

[75] Inventors: Shigemi Takahashi; Nobuyoshi Inoue; Takao Ogawa; Noribumi Tachihara, all of Tokyo, Japan

[73] Assignee: Copal Company Limited, Tokyo, Japan

[21] Appl. No.: 09/070,762

[22] Filed: May 1, 1998

[30] Foreign Application Priority Data

May 12, 1997 [JP] Japan ................................. 9-137883

[51] Int. Cl.⁶ ..................................................... B32B 9/00
[52] U.S. Cl. ........................ 428/220; 428/114; 428/143; 428/408; 428/458; 428/474.4; 428/694 SL; 528/310; 396/452; 396/456; 396/460; 264/331.12
[58] Field of Search ..................... 428/143, 458, 428/474.4, 694 SL, 408, 220, 114; 396/452, 456, 460; 264/331.12; 528/310

[56] References Cited

U.S. PATENT DOCUMENTS

| | | | |
|---|---|---|---|
| 4,775,583 | 10/1988 | Kawamura | 428/294 |
| 4,857,255 | 8/1989 | Imanishi et al. | 264/216 |
| 4,992,813 | 2/1991 | Matsubara | 396/452 |
| 5,025,278 | 6/1991 | Matsubara | 354/246 |
| 5,202,715 | 4/1993 | Matsubara | 354/246 |
| 5,283,027 | 2/1994 | Sakamoto | 264/320 |
| 5,283,098 | 2/1994 | Matsubara | 428/113 |
| 5,323,205 | 6/1994 | Matsubara et al. | 354/431 |
| 5,344,689 | 9/1994 | Ide et al. | 428/114 |
| 5,630,190 | 5/1997 | Matsubara | 396/488 |
| 5,659,007 | 8/1997 | Akiyoshi et al. | 528/310 |
| 5,797,055 | 6/1998 | Matsubara et al. | 396/484 |
| 5,853,907 | 12/1998 | Yamada et al. | 428/694 |

FOREIGN PATENT DOCUMENTS

| | | |
|---|---|---|
| 8633679 | 3/1987 | Germany . |
| 57-17932 | 1/1982 | Japan . |
| 57-24925 | 2/1982 | Japan . |
| 57-60315 | 4/1982 | Japan . |
| 57-118226 | 7/1982 | Japan . |
| 58-149030 | 9/1983 | Japan . |
| 60-63825 | 5/1985 | Japan . |
| 63-165828 | 7/1988 | Japan . |
| 4-211232 | 8/1992 | Japan . |
| 7-270855 | 10/1995 | Japan . |

*Primary Examiner*—Deborah Jones
*Assistant Examiner*—Abraham Bahta
*Attorney, Agent, or Firm*—Sixbey Friedman Leedom & Ferguson; Thomas W. Cole

[57] ABSTRACT

A light-shielding blade for use in cameras utilizes a film of para-type aromatic polyamide for its base material. The light-shielding blade has a single-layer structure using an aramid film as its blade material. The film is added with carbon black at a ratio of 2 to 10 percent by weight relative to a total weight of the blade material. Alternatively, the light-shielding blade has a laminated structure with a plurality of aramid films stacked each other and having a thickness of 2 to 30 microns each, a total thickness being set to a range of 50 to 200 microns.

7 Claims, 5 Drawing Sheets

FIG.2 (A)
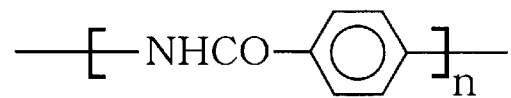
FIG.2 (B)
|  | ARAMID | NYLON |
|---|---|---|
| RIGIDITY | HIGH | LOW |
| STRENGTH | HIGH | LOW |
| HEAT RESISTANCE | HIGH | LOW |
| SOLVENT RESISTANCE | WEAK TO STRONG ACID | WEAK TO STRONG ACID |
| LIGHT BLOCKING | NATURALLY NO LIGHT BLOCKING | NATURALLY NO LIGHT BLOCKING |
| PRICE | HIGH | LOW |
FIG.2 (p)   FIG.2 (m)   FIG.2 (o)
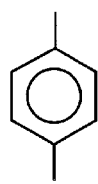 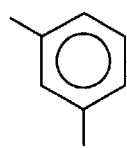 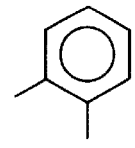

FIG.3

| | ARAMID | PEN | PET | ALUMINUM ALLOY | CFRP |
|---|---|---|---|---|---|
| DENSITY (g/cm³) | 1.50 | 1.36 | 1.40 | 2.7 | 1.5 |
| [MECHANICAL PROPERTIES] | | | | | |
| TENSILE STRENGTH (kg/mm²) | 40~60 | 27 | 25 | 45 | 100 |
| ELONGATION OF BREAK (%) | 40~70 | 85 | 130 | 12 | 1.5 |
| TENSILE MODULUS (kg/mm²) | 900~1300 | 620 | 400 | 7000 | 6000 |
| FLEXURAL MODULUS (kg/mm²) | | 770 | 540 | | 9000 |
| TENSILE PROPAGATION RESISTANCE (g/mm) | 170~300 | 600 | 800 | | |
| INFLECTION RESISTANCE (TIMES) | >100000 | | >100000 | | |
| [THERMAL PROPERTIES] | | | | | |
| MELTING POINT (℃) | NONE | 269 | 263 | | |
| GLASS TRANSITION POINT (℃) | NONE | 113 | 69 | | |
| THERMAL EXPANSION COEFFICIENT (×10⁻⁶/℃) | 5~25 | 13 | 15 | | |
| TERMAL SHRINKAGE | | | | | |
| 200℃×10MIN. (%) | 0~0.2 | 1~2 | 4 | | |
| 250℃×10MIN. (%) | 0.5~4 | | VERY HIGH | | |
| LONG TERM HEAT RESISTANCE TEMPERATURE (℃) | 180 (MECHANICAL) | 160 (MECHANICAL) | 105 | | |
| BURNING | SELF-EXTINGUISH | | GRADUALLY BURN | | |
| [CHEMICAL PROPERTIES] | | | | | |
| MOISTURE ABSORPTION RATE (%, 75%RH) | 1.5 | | 0.4 | | |
| MOISTURE EXPANSION COEFFICIENT (×10⁻⁶/%RH) | 8~15 | | 12 | | |
| CHEMICAL ATTACK RESISTANCE | EXCELLENT | | EXCELLENT | | |
| ORGANIC SOLVENT | WEAK TO STRONG ACID | | | | |
| ACID | | | GOOD | | |
| ALKALI | EXCELLENT | | GOOD | | |

LIGHT SHIELDING BLADE FOR CAMERA MADE OF PARA-ORIENTATION AROMATIC POLYAMIDE FILM

BACKGROUND OF THE INVENTION

1. Field of the Invention

The present invention generally relates to a shutter blade for use in a focal plane shutter or a lens shutter of a camera and a diaphragm blade of a camera, to be more specific, to a plastic light-shielding blade for use in a camera that requires to block light.

2. Description of Related Art

A blade such as a shutter blade and a diaphragm blade for use in an optical apparatus such as a camera must be light in weight and high in rigidity and, at the same time, must intrinsically have light-shielding properties because the blade covers a photosensitive material at the front side thereof to block light from being exposed to the material. Besides, it is desired for the blade to be black in color and low in reflectivity because the blade must absorb light to prevent the light from being reflected on the surface of the blade. Further, the blade must have a good planarity and a high resistivity against contact electrification because the blade operates in contact with another. These properties are especially important for a shutter blade that operates at a high speed. To satisfy the above-mentioned requirements, various light-shielding blades have been developed as disclosed for example in Japanese Unexamined Utility Model Publication No. Sho 60-63825, Japanese Unexamined Patent Publication No. Sho 63-165828, Japanese Unexamined Patent Publication No. Sho 57-17932, Japanese Unexamined Patent Publication No. Sho 57-24925, Japanese Unexamined Patent Publication No. Sho 57-60315, Japanese Unexamined Patent Publication No. Sho 57-118226, Japanese Unexamined Patent Publication No. Sho 58-149030, Japanese Unexamined Patent Publication No. Hei 4-211232, and Japanese Unexamined Patent Publication No. Hei 7-270855. Of the above-mentioned publications, No. Sho 57-24925 discloses a light-shielding blade made of an aluminum alloy sheet for use in a camera. No. Sho 58-149030 discloses, for light-shielding blade materials, plastics such as polyethylene, polypropylene, polyvinyl chloride, polyamide, epoxy resin, phenolic resin, urea resin, polyurethane, polystyrene, polypropylene, and unsaturated polyester resin, or materials obtained by reinforcing these materials with fibers such as glass fiber, carbon fiber, boron fiber, higher polymer organic fiber, boron nitride, and whisker. No. Hei 4-211232 discloses use of aromatic polyamide fiber for a blade support arm.

Currently, a light-shielding blade made of polyethylene terephthalate (PET) is in wide use because of its low cost and light weight. However, because PET is comparatively low in strength such as tensile elasticity, PET is not suitable for use in a light-shielding blade for a focal plane shutter that operates at a high speed. If PET is used as the material of a light-shielding blade, the blade is deflected by vibration or shock caused by traveling or braking of the blade. This deflection leads to damage of the blade or collision between blades. Therefore, guaranteed durability of the shutter using PET light-shielding blades is generally in the order of 10,000 shutter operation times, far less than 30,000. Actually, if PET light-shielding blades are used for a focal plane shutter, a derived maximum shutter speed is limited to $1/1000$ second to $1/2000$ second. To achieve shutter speeds of $1/4000$ second or higher, in case that a focal plane shutter is constituted by four light-shielding blades for example, the first and second blades are made of aluminum alloy (for example, superduralumin) and the third and fourth blades are made of PET. If all of four blades are made of PET, the deflection may be caused by traveling or braking of the blades.

SUMMARY OF THE INVENTION

It is therefore an object of the present invention to provide a light-shielding blade that is low in cost and, at the same time, capable of achieving high shutter speeds.

In carrying out the invention and according to one aspect thereof, there is provided a light-shielding blade, for use in cameras, made of a para-type aromatic polyamide film. In one preferred embodiment of the invention, the light-shielding blade associated with the present invention has a single-layer structure using as its material a single film of para-type aromatic polyamide with a black pigment added to the film at a ratio of 2 to 10 percent by weight relative to a total weight of the blade material. In another preferred embodiment of the present invention, the light-shielding blade according to the present invention has a laminated structure formed by laminating a plurality of films each having a thickness of 2 to 30 microns, a total thickness of the blade material being within a range of 50 to 200 microns. Preferably, black pigment is mixed with an adhesive bonding the plurality of films together, a total amount of the black pigment being within a range of 2 to 10 percent by weight relative to the total weight of the blade material. Preferably still, at least one layer of aluminum foil may be inserted between the laminated films. Preferably again, a lubricant coating is applied to at least one side of the blade material. Alternatively, a black ink having light-shielding and solvent-resistant properties is applied to at least one side of the blade material having an optical density of 2 or higher, and a black coating having lubricating properties is applied over the black ink, thereby increasing the optical density to 8 or higher.

According to the present invention, the light-shielding blade is made of a para-type aromatic polyamide film. The para-type aromatic polyamide film is comparable to the PET film in specific gravity, but 2 to 3 times higher than PET in tensile elasticity, thereby providing more excellent strength. Further, the para-type aromatic polyamide film has a high heat resistance and therefore is less susceptible to heat-induced deformation, thereby requiring no annealing. Still further, the para-type aromatic polyamide film allows the temperature of coat baking for imparting lubrication to be set high, thereby forming a lubrication coating excellent in resistance to scuffing. Yet further, the para-type aromatic polyamide film has self-extinguishing properties, thereby posing no fear of igniting the light-shielding blade even if the blade is exposed to the sunlight for example condensed by a camera lens. When laminating a plurality of para-type aromatic polyamide films by an adhesive, light-shielding properties can be enhanced by mixing a black pigment such as carbon black into the adhesive. This provides a light-shielding blade that is high in general versatility and that has a practical thickness. The specific gravity of para-type aromatic polyamide is about 1.5 $g/cm^2$, about a half of the specific gravity of duralumin, which is about 2.7 $g/cm^2$. Conventionally, light-shielding blades that do not require a strength (rigidity) as high as an aluminum alloy such as duralumin must use but the aluminum alloy, because any other suitable materials are unavailable. Use of the aluminum alloy for the light-shielding blade must maintain a rather high shutter blind speed in order to prevent synchronism from being missed. To maintain the shutter blind speed high, the capacity of a spring for activating the shutter must be increased, which adversely increases a set capacity accordingly. In order to cope with this situation, the torque of a shutter driving motor must be increased, which in turn inevitably increases the size of the motor and shortens the life of a built-in power source such as battery.

As described above, the para-type aromatic polyamide is lower than the aluminum alloy but higher than PET in strength. Therefore, according to the present invention, it is practical to replace at least some of the aluminum alloy light-shielding blades with the para-type aromatic polyamide blades. Conventionally, the aluminum alloy is used instead of intrinsically more desirable PET because of higher mechanical strength of the aluminum alloy. However, this causes adverse effects such as slowed shutter blind speed and increased set torque as well as increased cost. Use of the para-type aromatic polyamide light-shielding blades instead of the aluminum alloy light-shielding blades can prevent the shutter blind speed from being lowered and the torque from being increased and, at the same time, can ensure the durability of the blades.

The conventional PET must be annealed before being formed into light-shielding blades in order to prevent the blades from being deformed in an high-temperature environment. The para-type aromatic polyamide material has a heat resistance temperature as high as 180 degrees centigrade, and therefore need not be annealed, leading to further cost reduction. Annealing of the above-mentioned materials is basically the same as that of metal materials, its purpose being to remove residual distortion. In a high temperature environment, it is possible that planarity of PET is damaged to result in deformed shape, so that thermal processing or annealing is performed on PET beforehand to forcibly develop deformation, thereby eliminating distortion. Then, the PET film is punched into light-shielding blades. Sometimes, the resultant light-shielding blades are pressurized to remove distortion. On the contrary, para-type aromatic polyamide has no glass transition point, so that no distortion removal operation is required. Consequently, the para-type aromatic polyamide film can be formed as a blade excellent in planarity.

BRIEF DESCRIPTION OF THE DRAWINGS

These and other objects of the invention will be seen by reference to the description, taken in connection with the accompanying drawings, in which:

FIGS. 2(A), 2(B), 2(p), 2(m), and 2(o) are schematic diagrams illustrating chemical structures and properties of para-type aromatic polyamide used as material for the light-shielding blade associated with the present invention;

FIG. 3 is a table listing the properties of various light-shielding blade materials;

DETAILED DESCRIPTION OF PREFERRED EMBODIMENTS

This invention will be described in further detail by way of example with reference to the accompanying drawings.

Figure 1:
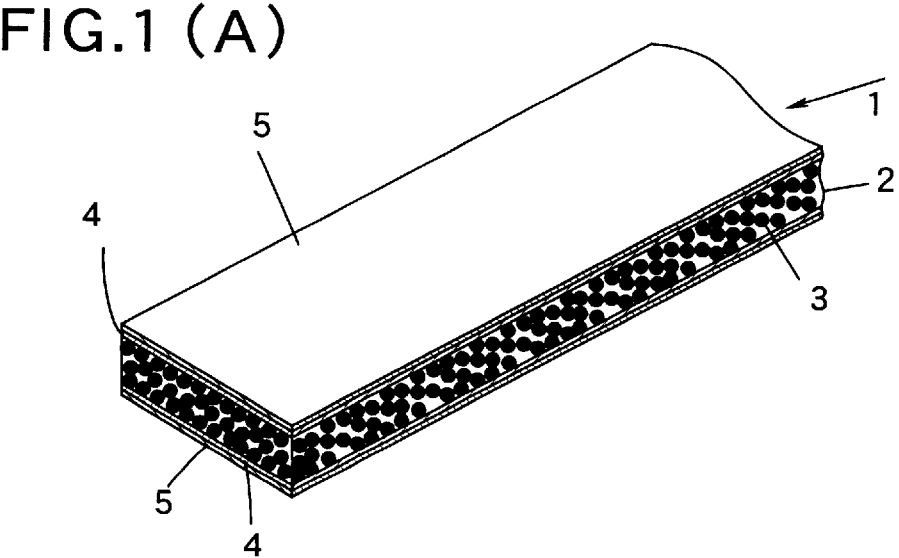
FIGS. 1(A), 1(B), and 1(C) are schematic cross sections illustrating a light-shielding blade associated with the present invention.
Figure 1:
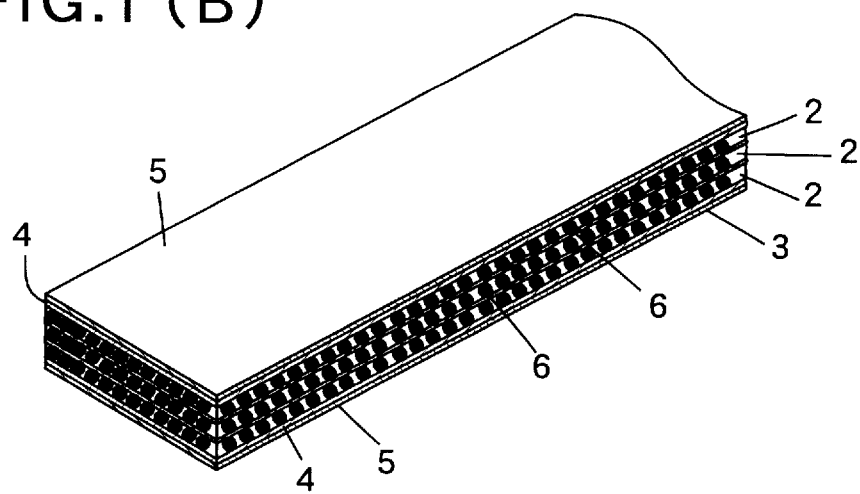
Figure 1:
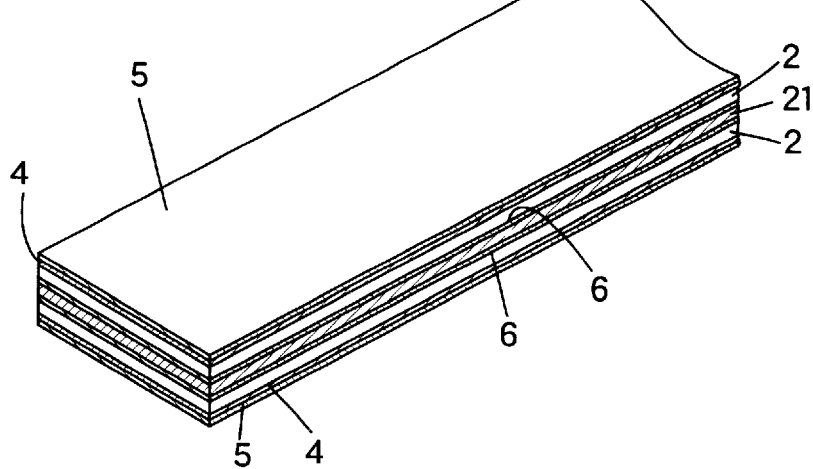

FIGS. 1(A), 1(B), and 1(C) are schematic perspective views illustrating a light-shielding blade practiced as preferred embodiments of the invention, this light-shielding blade being for use in a camera. This light-shielding blade finds application in a sector blade of a focal plane shutter or a lens shutter or in a diaphragm blade. As shown in FIG. 1(A), a light-shielding blade 1 associated with the present invention uses as its base material a film 2 made of para-type aromatic polyamide (hereafter referred to as an aramid film). The embodiment shown in FIG. 1(A) has a single-layer structure with a single piece or ply of the aramid film 2 used as the blade material. A carbon black 3 is added as a black pigment to the aramid film 2 at a ratio of 2 to 10 percent by weight relative to a total weight of the blade material. Enhancing light-shielding properties requires the addition of the black pigment such as the carbon black 3. However, too much addition deteriorates the dispersive power of the film material. If this happens, the planarity of the aramid film 2 is adversely affected, making film formation difficult. Therefore, it is suitable that the addition is made in an amount within 2 to 10 percent by weight to the total weight of the blade material.

In the embodiment shown in FIG. 1(A), the aramid film 2 having an optical density of 2 or higher is coated on both sides or faces thereof with a black ink 4 having light-shielding and solvent-resistant properties. Further, a black coating (lubricant coating) 5 is applied over the black ink 4, thereby adjusting the optical density to 8 or higher. It should be noted that the black ink 4 and the lubricant coating 5 may be applied only to one side of the aramid film 2 as required. Only adding the carbon black 3 to the aramid film 2 does not impart enough light-shielding properties. Therefore, the black ink 4 and the lubricant coating 5 are applied to the surface of the aramid film 2, thereby ensuring the light-shielding properties practically necessary for the light-shielding blade and satisfying the properties of lubrication, durability, antireflection, resistance to scuffing, and resistance to solvent. It should be noted that the black ink 4 is a generic name of materials for forming a coating having high light-shielding properties. The black lubricant coating 5 is a so-called functional coating generally formed by mixing as coating components several tens of matters including resin, antireflection agent, lubricant, black pigment, dispersing agent, hardener, and thinner. The aramid film 2 itself has no light-shielding properties, so that the black pigment such as the carbon black 3 is added to provide a certain degree of light-shielding properties. For example, the addition of the carbon black increases the optical density to at least 2 or higher. Optical density of 8 or higher is required for the light-shielding blade, and is secured by applying the black ink 4 and the black lubricant coating 5 to at least one side of the aramid film with the carbon black 3. Generally, optical density can be measured with an optical densitometer. When the optical density of a film is around 8, the sun is observed through the film, and the observed image approximately presents the contour of the sun. Also, at this level of optical density, the light source of about 46,000 lux of an overhead projector (OHP) cannot be seen any more. At an optical density of about 9, the sun cannot be seen any more through the film. It should be noted that optical density 2 indicates 1% in transmittance. Generally, let optical density be D, intensity of transmitted light be I, and intensity of incident light be $I_0$, then $D=-\log_{10} I/I_0$.

In another preferred embodiment shown in FIG. 1(B), three plys of aramid film 2 each having a thickness of 2 to 30 microns are laminated by an adhesive 6 to form a blade, a total thickness of which falls within a range of 50 to 200 microns. It should be noted that the number of aramid film sheets is not restricted to 3; 2, 4, or 5 sheets for example may also be laminated. Each aramid film 2 contains dispersion of the carbon black 3. As required, a black pigment such as the carbon black may be mixed in the adhesive 6. In this case, a total amount of the black pigment must be set to a range of 2 to 10 percent by weight relative to the total weight of the blade material. Like the embodiment shown in FIG. 1(A), the laminated blade is applied on both sides thereof with the black ink 4 and the lubricant coating 5.

In the embodiment shown in FIG. 1(B), three sheets of the aramid film 2 each having a comparatively small thickness of 2 to 30 microns are laminated to form a light-shielding blade. The aramid films falling in this range of thicknesses are commercially available. For example, Microtron (Trademark) is available by Toray Industries, Inc. In the embodiment shown in FIG. 1(B), the thin aramid films 2 are laminated such that a total thickness of the light-shielding blade falls within a range of 50 to 200 microns. If the thickness exceeds 200 microns, the thickness of the shutter unit incorporating the light-shielding blade increases, which in turn increases the size of the entire camera. In the case of a focal plane shutter, if the thickness of each of overlapping light-shielding blades exceeds 200 microns, the distance between a front blind and a rear blind is made larger, resulting in a reduced shutter efficiency. Conversely, if the thickness becomes below 50 microns, deformation due to deflection occurs more easily. Like the light-shielding blade 1 shown in FIG. 1(A), a thickness of 50 to 200 microns may be obtained only by a single sheet of aramid film. However, the plural sheets of thin aramid film 2 are available comparatively easily, and are laminated with each other to the above-mentioned thickness. The fabrication cost lowers. If a carbon black is mixed in the adhesive 6 for bonding these sheets of aramid film 2, the density of the carbon black in the adhesive must be set to 2 to 10 percent by weight to the total weight of the blade material. Too much mixture amount of the carbon black reduces the bonding strength, causing the lamination to peel off.

A further preferred embodiment of the invention shown in FIG. 1(C) is basically the same as the embodiment shown in FIG. 1(B). The former differs from the latter in that at least one sheet of an aluminum foil 21 is sandwiched between two sheets of aramid films 2 at an interface therebetween. Because of this insertion of the aluminum foil 21, no carbon black is added to either sheet of aramid film 2. Preferably, the thickness of the aluminum foil 21 is 15 microns or more. A smaller thickness may increase pin holes, causing leak of light. On the other hand, too much thickness increases the weight of the entire light-shielding blade, causing an adverse affect in making the blade of light-weight. Consequently, in the embodiment shown in FIG. 1(C), the aluminum foil 21 is made thin to a degree at which no pinholes are produced, thereby maintaining enough light-shielding properties by use of the black ink 4 and the black lubricant coating 5.

The chemical name of para-type aromatic polyamide for use in the material forming the light-shielding blade associated with the present invention is poly (p-phenyleneterephtalamide), a molecular structure thereof being shown in FIG. 2(A). This para-type aromatic polyamide is formed into a uniform film, which is then biaxially orientated. The resultant film is used for camera light-shielding blades. Polyamides are largely classified into aliphatic polyamides and aromatic polyamides. Generally, "polyamide" denotes an aliphatic polyamide typified by nylon. On the other hand, all aromatic polyamides are called aramid in distinction from the aliphatic polyamides.

Conventionally, aromatic polyamides have been used as fibers because of inability of molten forming. Comparison between nylon and aramid indicates that nylon is far inferior to aramid in rigidity, strength, resistance to heat, and so forth. FIG. 2(B) is a table showing comparisons between aramid and nylon in rigidity, strength, resistance to heat, resistance to solvent, light-shielding properties, and price.

There are three types of di-substituted aromatic series; p- (para) bonding shown in FIG. 2 (p), m- (meta) bonding shown in FIG. 2 (m), and o- (ortho) bonding shown in FIG. 2(o). As seen from these figures, para bonding has linearity in molecular arrangement. Meta bonding and ortho bonding have no such linearity. Therefore, meta bonding makes it difficult to form a uniform film having certain degrees of rigidity and strength that is suitable for use in a light-shielding blade. Ortho bonding is estimated to be still weaker than meta bonding. The para-type aromatic polyamide associated with the present invention is poly (p-phenyleneterephtalamide) constituted by p- (para) bonding, one of the aromatic polyamides obtained by polycondensation reaction between terephtalate chloride and p-phenylenediamine, thereby providing strength higher than meta bonding. Conventionally, poly (p-phenyleneterephtalamide) has been obtained as underwater spinning by melting the poly (p-phenyleneterephtalamide) in a sulfuric acid solvent. Recent technological development makes it possible to form the poly (p-phenyleneterephtalamide) into a uniform film. For example, such a film is available as Microtron (Trademark) by Toray Industries, Inc. The para type is preferable for a light-shielding blade. As described above, the meta type and the ortho type have no linearity in molecular arrangement, so that these types are lower than the para type in rigidity and strength. Therefore, the meta type and the ortho type are not suitable for the material of a light-shielding blade.

It should be noted that Japanese Unexamined Patent Publication No. Sho 58-149030 mentioned above discloses a polyamide as the material of a light-shielding blade. However, it seems that the disclosed polyamide is general one, namely a so-called aliphatic polyamide (nylon). The aromatic polyamide (aramid) used in the present invention is thinner and lighter than nylon, and provides a light-shielding blade that can operate at high speeds. Japanese Unexamined Patent Publication No. Sho 63-165828 mentioned before discloses a plastic light-shielding blade with aramid fibers embedded. The fibers are not used alone. They are reinforced with a matrix resin. Therefore, contribution of aramid fibers to the rigidity is small for a ratio to the thickness. On the contrary, the present invention uses an aramid film for the light-shielding blade. Therefore, the ratio of aramid becomes high, and a high rigidity is expected. Generally, a film is supplied in a roll, so that a mold of sequential feed type is used in press working, allowing coating for example to be continuously processed. This facilitates working and process management, thereby significantly reducing the fabrication cost.

FIG. 3 is a table listing comparisons between the properties of various materials for use in a light-shielding blade. In order to make comparison with the aramid for use in the present invention, this table lists the properties of polyethylene terenaphtalete (PEN), PET, aluminum alloy (superduralumin), and carbon fiber reinforced plastic (CFRP). As seen from FIG. 3, while aramid is generally comparable to PET in specific gravity, aramid is about 2 to 3 times higher in tensile elasticity. Moreover, since aramid has a high heat-resistance temperature, no annealing is required. The temperature for baking or curing the black lubricant coating can be raised, thereby providing coating excellent in resistance to scuffing. The self-extinguishing properties of aramid does not cause ignition due to sunlight condensed by a camera lens for example. Conventionally, widely used PET is annealed before being formed into a final product in order to prevent deformation from occurring in a high-temperature environment. The heat resistance temperature of aramid is very high in the order of about 180 degrees centigrade, so that no annealing is required, thereby lowering the fabrication cost still further.

Figure 4:
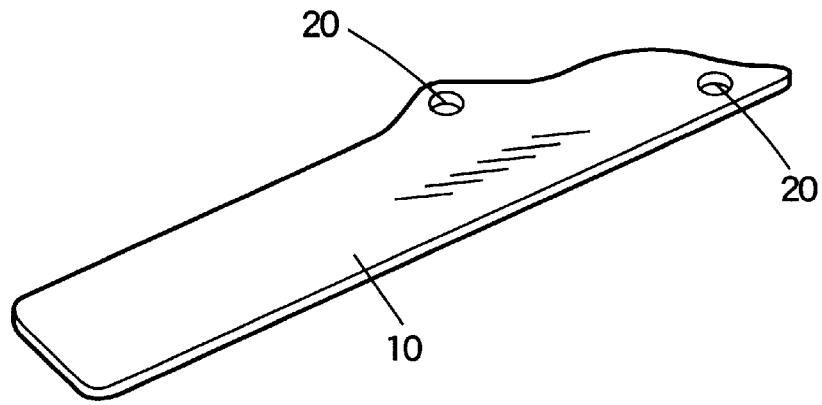
FIG. 4 is a perspective view illustrating a focal plane shutter blade, one example of the light-shielding blade associated with the present invention.

FIG. 4 shows an example of a focal plane shutter blade or vane obtained by punching the light-shielding plate member shown in FIG. 1(A), 1(B) or 1(C). A shutter blade 10 has an elongated shape, a pair of linking holes for fixing being formed at one end thereof.

Figure 5:
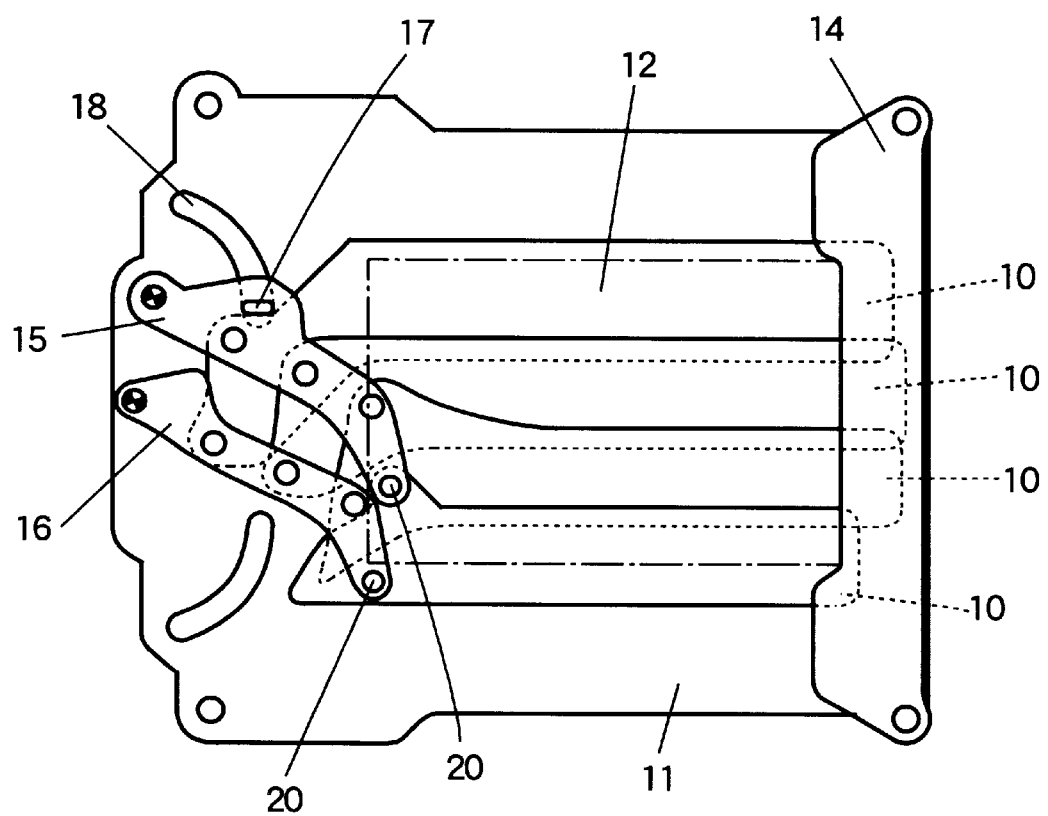
FIG. 5 is a schematic top view illustrating a shutter comprised of the focal plane shutter blades shown in FIG. 4.

FIG. 5 shows an example in which the focal plane shutter blade of FIG. 4 is assembled on a focal plane shutter. A shutter base plate 11 is provided at the center thereof with an oblong opening 12 (indicated by dashed lines). In a rest state, four front blades 10 partially overlap with each other, and are optically blocking or shielding the shutter opening 12. Likewise, a rear blade group, not shown, is arranged below the front blade group. Each shutter blade is held at tip thereof from moving in an undesired manner by a blade holder 14. A pair of arms 15 and 16 are pivotally supported in parallel to each other at the left end of the base plate 11. Each front blade 10 is linked at the other tip thereof to the pair of arms 15 and 16. Likewise, each rear blade, not shown, is also linked to a pair of arms, not shown. The main arm 15 is provided with an oblong hole 17. The base plate 11 is provided with a long groove 18 along the locus of the oblong hole 17 caused by pivoting of the main arm 15. The oblong hole 17 is linked with a drive pin, no shown, that penetrates the base plate 11 through the long groove 18. When a shutter release button, not shown, is pressed, the drive pin moves up by a driving force along the long groove 18 provided on the base plate 11. At the same time, the main arm 15 linked to the drive pin at the oblong hole 17 and the follow arm 16 operatively associated with the main arm 17 pivot upward. This pivoting makes the front blades 10 travel up vertically, thereby releasing the opening 12. Then, the rear blade group, not shown, travels vertically to close the opening 12, upon which exposure is completed.

Figure 6:
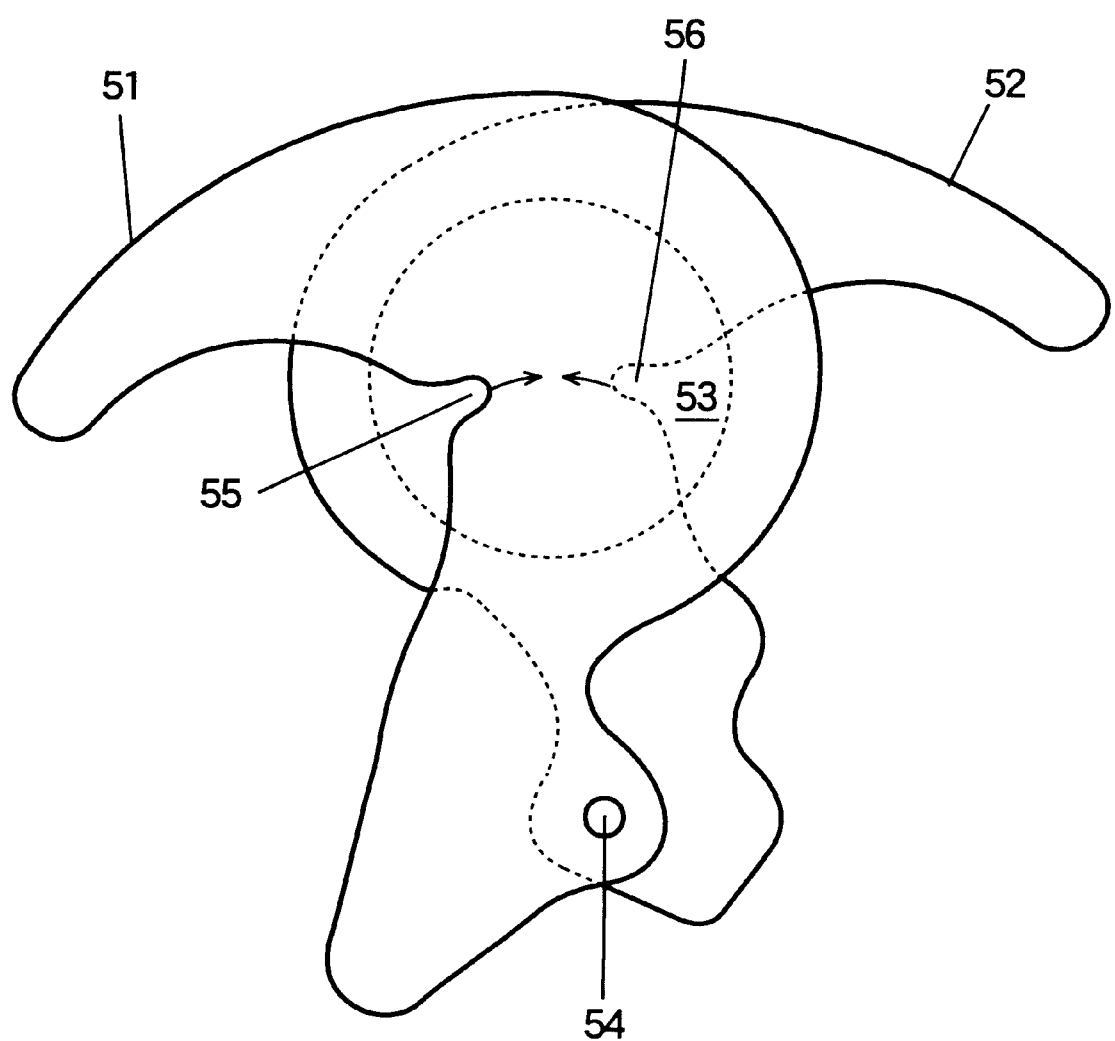
FIG. 6 is a top view illustrating a lens shutter blade, one example of the light-shielding blade associated with the present invention.

FIG. 6 shows a shape of a lens shutter blade or vane fabricated by use of the blade material shown in FIG. 1(A), 1(B), or 1(C). As shown in FIG. 6, a pair of shutter blades 51 and 52 are arranged to cover an opening 53. These shutter blades are pivoted around a fulcrum 54 and spaced from the center of the opening 53 by a predetermined distance. The pair of light-shielding blades 51 and 52 are driven by a driving means, not shown, to travel in the opposite directions, thereby opening or closing the opening 53. In the state shown, the opening 53 is in a fully closed state. From this state, the shutter blade 51 pivots clockwise and the other shutter blade 52 pivots counterclockwise. At this moment, dents 55 and 56 called tear drops overlap with each other, thereby starting to open the opening 53 from the center portion thereof. If, at this moment, the shutter blades 51 and 52 are stopped, a so-called small diaphragm state is obtained. The tear drops 55 and 56 are provided to minimize an error of the small diaphragm caused by deviation in the rotary angles of the shutter blades.

As described and according to the present invention, the light-shielding blades are made of para-type aromatic polyamide. Therefore, as compared with PET light-shielding blades, strength can be increased twofold to threefold without increasing specific gravity or thickness. This makes it unnecessary to increase the energy of a drive spring, and this allows a high-speed shutter operation. In other words, an enough operating life is assured, while a high-speed shutter operation is realized. In addition, the para-type aromatic polyamide film need not be annealed, which would be otherwise required to eliminate distortion in the prior art, thereby contributing to the reduction of fabrication cost. Further, the heat resistance properties of this material allows coating excellent in resistance to scuffing. Still further, the self-extinguishing properties of this material ensures safety.

While the preferred embodiments of the present invention have been described using specific terms, such description is for illustrative purposes only, and it is to be understood that changes and variations may be made without departing from the spirit or scope of the appended claims.

What is claimed is:

1. A light-shielding camera blade comprising a film made of para-orientation aromatic polyamide having light shielding properties with an optical density of at least 8.

2. A light shielding blade as claimed in claim 1, wherein said light-shielding blade has a single-layer structure using as said blade material a single film made of para-orientation aromatic polyamide, and wherein a black pigment is added to said single film at a ratio of 2 to 10 percent by weight relative to a total weight of said blade material.

3. A light-shielding blade as claimed in claim 1, wherein said light-shielding blade has a laminated structure using as said blade material a plurality of films each having a thickness of 2 to 30 microns, and wherein a total thickness of said blade material is within a range of 50 to 200 microns.

4. A light-shielding blade as claimed in claim 3, wherein an adhesive is used to bond the plurality of the films and is mixed with a black pigment, and wherein a total amount of said black pigment is within a range of 2 to 10 percent by weight relative to a total weight of said blade material.

5. A light-shielding blade as claimed in claim 3, wherein at least one sheet of aluminum foil is sandwiched between the plurality of the films at an interface therebetween.

6. A light-shielding blade as claimed in claim 1, wherein said light-shielding blade is applied on at least one of opposite faces thereof with a lubricant coating.

7. A light-shielding blade as claimed in claim 6, wherein said blade material has an optical density of at least 2 and is applied on at least one face thereof with a black ink having light-shielding properties and solvent resisting properties, and wherein a lubricant black coating is applied over the black ink, thereby increasing the optical density to at least 8.

* * * * *